United States Patent [19]
Swartz

[11] 3,895,516
[45] July 22, 1975

[54] APPARATUS FOR CONTOUR AND LINEAR MEASUREMENT USING FLUIDS

[75] Inventor: Elmer L. Swartz, Annandale, Va.

[73] Assignee: The United States of America as represented by the Secretary of the Army, Washington, D.C.

[22] Filed: Mar. 18, 1974

[21] Appl. No.: 452,477

[52] U.S. Cl. .................................................. 73/37.6
[51] Int. Cl.² ......................................... G01B 13/06
[58] Field of Search .......... 73/37.6, 37.5, 37.7, 37.8

[56] References Cited
UNITED STATES PATENTS
| | | | |
|---|---|---|---|
| 3,232,096 | 2/1966 | Braijel | 73/37.6 |
| 3,495,442 | 2/1970 | Rejsa | 73/37.6 |

*Primary Examiner*—Jerry W. Myracle
*Attorney, Agent, or Firm*—Nathan Edelberg; Robert P. Gibson; Saul Elbaum

[57] ABSTRACT

A fluidic noncontact gaging device is provided which is comprised of two separate fluidic circuits, a lever having a nozzle at one end, tubular pivots extending transverse to said lever, and a fulcrum which provides a gas bearing for the pivots. The nozzle attached to one end of the lever is arranged such that a constant flow of fluid is emitted therefrom onto the specimen. Any changes in the position of the nozzle above the specimen is translated to a corresponding change at the other end of the lever by a pivot of the lever on the fulcrum. Another fluidic nozzle and sensing circuit at the other end of the lever positioned adjacent to the exteriority of the lever senses any change in the position of the lever and provides a corresponding output signal. Fluid is fed to the nozzle above the specimen by a spaced arrangement of orifices and tubing within the fulcrum of the lever. The pivots of the lever are suspended within the fulcrum on a cushion of flowing gas. A dampening device is attached to the lever to prevent unwanted oscillation. The device is useful to remotely measure thickness and contours of objects which by their physical characteristics are unable to be touched.

5 Claims, 3 Drawing Figures

APPARATUS FOR CONTOUR AND LINEAR MEASUREMENT USING FLUIDS

RIGHTS OF THE GOVERNMENT

The invention herein may be manufactured, used, and licensed by or for the United States Government for governmental purposes without the payment to the inventor for any royalty thereon.

BACKGROUND OF THE INVENTION

1. Field Of The Invention

This invention relates to a fluid position-sensing means and particularly to a non-contacting position signal-transmitting device for providing a remotely located position-indicating means, a position-responsive control means and the like.

2. Description Of The Prior Art

In many commercial applications, the position of the object or surface is detected to provide a monitoring record and/or to provide a control such as a positioning control for a tool or rejection mechanism with respect to a work member. For example, in the manufacture of shell casings, and other similar work involving measurement of an object at a high temperature, a transducer may be provided to sense the relative relationship of the work and a working tool or to determine the shape of the object before proceeding further with processing. The transducer provides an output signal which is interconnected into a tool-positioning or rejection control means to maintain a predetermined movement of the work relative to the working tool. Various sensing devices or transducers generally including a work-engaging follower have been employed in the positioning art to generate an error signal which is interconnected to actuate a positioning drive means or rejection drives means or movement drive means. Although such systems may provide an improved means for positioning over the alternative manual or presetting control, they generally encounter a proportional offset which limits the accuracy and applicability of such systems. Thus, the positioning control or contour measurement apparatus generally includes a closed servosystem having a forward amplifying unit to amplify an error signal and provide an interrelated drive signal for positioning of the work piece and work tool. The sensing means in such devices and apparatus is usually located in close proximity to the work and is therefore subjected to the same environment.

With mechanical contacting sensors and the like, the direct contact between the transducer and the work or a control template also introduces the usual problems associated with mechanical devices. Moreover, a work piece having an extremely high temperature or other deleterious environmental factor contributes adversely to the accuracy and operation of such sensors. Further mechanical engagement may produce undesirable loading on the sensed object and reduce the accuracy of the tracking. Such mechanical sensing is also practically impossible for detecting non-self-supporting surfaces.

Thus, although various generally satisfactory position control devices have been employed, they have certain limitations and undesirable features which reduce the usefulness and applicability of the devices in the commercial and manufacturing art.

Accordingly, it is an object of this invention to provide a device which is capable of remotely measuring thickness and contours of objects which by their physical characteristics are unable to be touched.

Another object of this invention is to provide a remote measurement apparatus supported by a unique air bearing pivot.

An additional object of this invention is to provide a remote measurement apparatus having a spaced fluidically-linked position-sensing feedback means.

These and other objects of the present invention will become more apparent from the following specification, accompanying drawings, and appended claims.

SUMMARY OF THE INVENTION

The present invention is particularly directed to a fluidic position sensor employing a fluid control system responsive to the movement of a lever suspended on air and emitting a free stream which engages the object or surface. The fluid control system emits a second free stream of air which engages and detects the position of the lever surface. Generally, in accordance with the present invention, a first fluid source or stream forming means is adapted to be connected to a fluid supply such as air, liquid, mixtures thereof, and the like. This first forming means establishes a free fluid signal at one end of the lever and engages the object or surface. A second forming means establishes another free fluid signal which engages the surface of the lever at the other end thereof. The position of the surface of the other lever end is detected or sensed. A signal means is connected to the second forming means and particularly to the passageway upstream of the second free stream or signal to detect the characteristic of the free stream. The fulcrum of the lever is mounted in spaced relationship to the exteriority of the lever and establishes a constant jet of fluid for supporting said exteriority. A mitigating means is attached to the lever to dampen oscillations thereof.

BRIEF DESCRIPTION OF THE DRAWINGS

The specific nature of the invention as well as other objects, aspects, uses, and advantages thereof will clearly appear from the following description and from the accompanying drawings, in which.

DESCRIPTION OF THE PREFERRED EMBODIMENT

Figure 1:
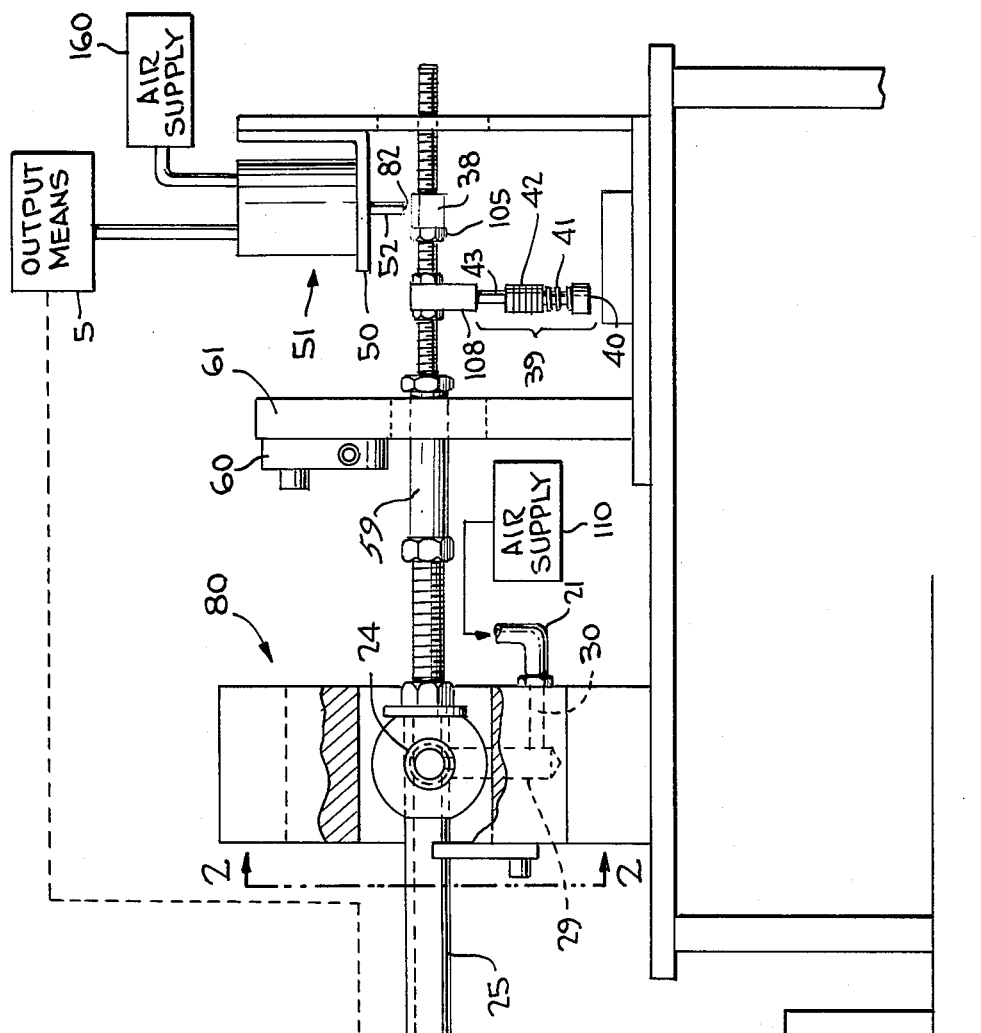
FIG. 1 is a partial cross section of an embodiment of the invention for measuring the eccentricity of a cylindrical member.

Referring to the drawings and particularly to FIG. 1, a cylindrical member 100 is shown supported and rotated by a rotation mechanism 10 supported on a work bench 101. A first fluid supply nozzle 70 is positioned above the cylindrical member 100. This first fluid supply means 70 is attached to a lever member 25. A position sensor unit 51 is mounted on member 50 and has a second fluid supply means 52 for issuing constant fluid output stream 82 and establishing an output signal in accordance with the movement of the lever 25 and in particular in accordance with the contour or eccentricity of the cylindrical member 100. The lever 25 serves to transmit any movement of the nozzle member 70 such that it is detected by position sensor unit 51. The output signal of the sensor 51 is connected to a suitable output means 5, to either record configuration of the surface of member 100 or to provide an output control signal to an activating means. For example, the output means 5 may control tool 6 for rejecting member 100 should it not have an eccentricity within certain limits. The fulcrum means 80 illustrates a preferred construction of the present invention and provides a fluidic, noncontacting support means for the lever and at the same time a continous output for the nozzle 70. Because of the noncontacting fulcrum 80 the system has no inertial hysteresis and therefore provides an instantaneous signal to the output means 5. Moreover, the noncontacting fulcrum member 80 virtually isolates the environment of the lever 70 from the sensor 51.

Referring again to FIG. 1, specifically in this embodiment a sensing jet nozzle 52 forming a part of the unit 51 is attached to bracket 50 mounted on a work bench assembly 101 and is located to establish a stream 82 of a suitable fluid such as a gas, liquid, or mixture. The stream 82 is advantageously air to permit venting to the atmosphere. Stream 82 is directed toward and into engagement with the surface of platform member 38. The nozzle 52 is slightly spaced from the surface of cylindrical member 38 to establish a relatively short free stream such that the back pressure in the stream 82 within the nozzle 52 is dependent upon and directly proportional to the length of the spacing of the nozzle 52 from the surface of the platform member 38 for relatively small changes in the position of the nozzle 52. This provides a proportional signal which is fed to a suitable fluid pressure amplifier located within sensor unit 51. The amplifier output is connected to both the output means 5 and a means (not shown) for repositioning the nozzle 52, said means being a part of sensor unit 51. Sensor unit 51 is of the type described in Pat. No. 3,682,191 to Lechner. Any eccentricity in the cylindrical member 100 is communicated to platform member 38 by means of lever 25. Platform member 38 is a part of the lever 25.

Lever 25 as depicted in FIG. 1 is comprised of platform member 38 having a threaded portion and is connected to the lever by means of connector 105. Platform member 38 provides the reference surface for the sensor unit 51.

If the eccentricity of the cylindrical member 100 changes very rapidly the lever member 25 may vacillate. Damping member 39 attached to the lever is a means for preventing and stopping this vacillation. Damping member 39 is comprised of a cylindrical rod 43 concentrically attached to a larger cylindrical rod 108 which is mounted transverse to a lever 25 and in the plane of motion about the fulcrum 80. A spring 41 surrounds cylindrical member 43 and supports a hollow cylindrical member 42 which is located on cylindrical member 42. A stop member 40 is attached to the free end of cylindrical member 43 and is connected to the spring 41. In operation, should oscillations of the lever 25 occur, spring 41 in combination with cylindrical member 42 acts as a counter intertia to reduce the vacillations.

The fulcrum and air bearing assembly 80 is supplied with an air flow from air supply 110 however any other suitable fluid, liquid, or mixture may be utilized with success. The stream enters the passageway 30 within the fulcrum 80 by means of connector 21. Passageway 30 leads to a larger passageway 29 which is located vertically and directly underneath the pivot member 24.

Figure 2:
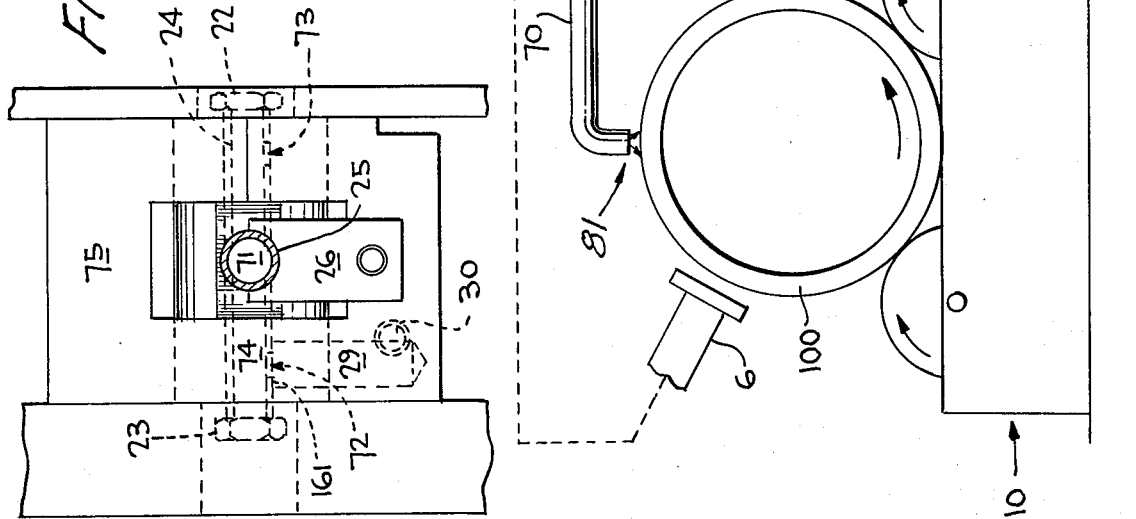
FIG. 2 is a cross section of the embodiment of FIG. 1 through the fulcrum of the lever along the line 2—2.

Referring now to FIG. 2, the stream traveling through the passageway 29 impinges upon the outer perimeter 161 of the orifice 72 within the pivot member 24 and a portion of the stream supports the pivot member. The remaining portion of the stream passes into the chamber 74 and distributes itself such that a portion travels through the opening 71 in the lever 25 and another portion is emitted through the orifice 73 of the pivot member 24. The portion of the fluid stream exiting through opening 73 supports that side of the pivot member. The pivot member 24 has end plugs 22 and 23 to prevent fluid from escaping from the ends thereof. The pivot member 24 is supported within the fulcrum block 75. Member 26 attached to the fulcrum block is a stop to prevent extreme movement of lever member 25.

Figure 3:
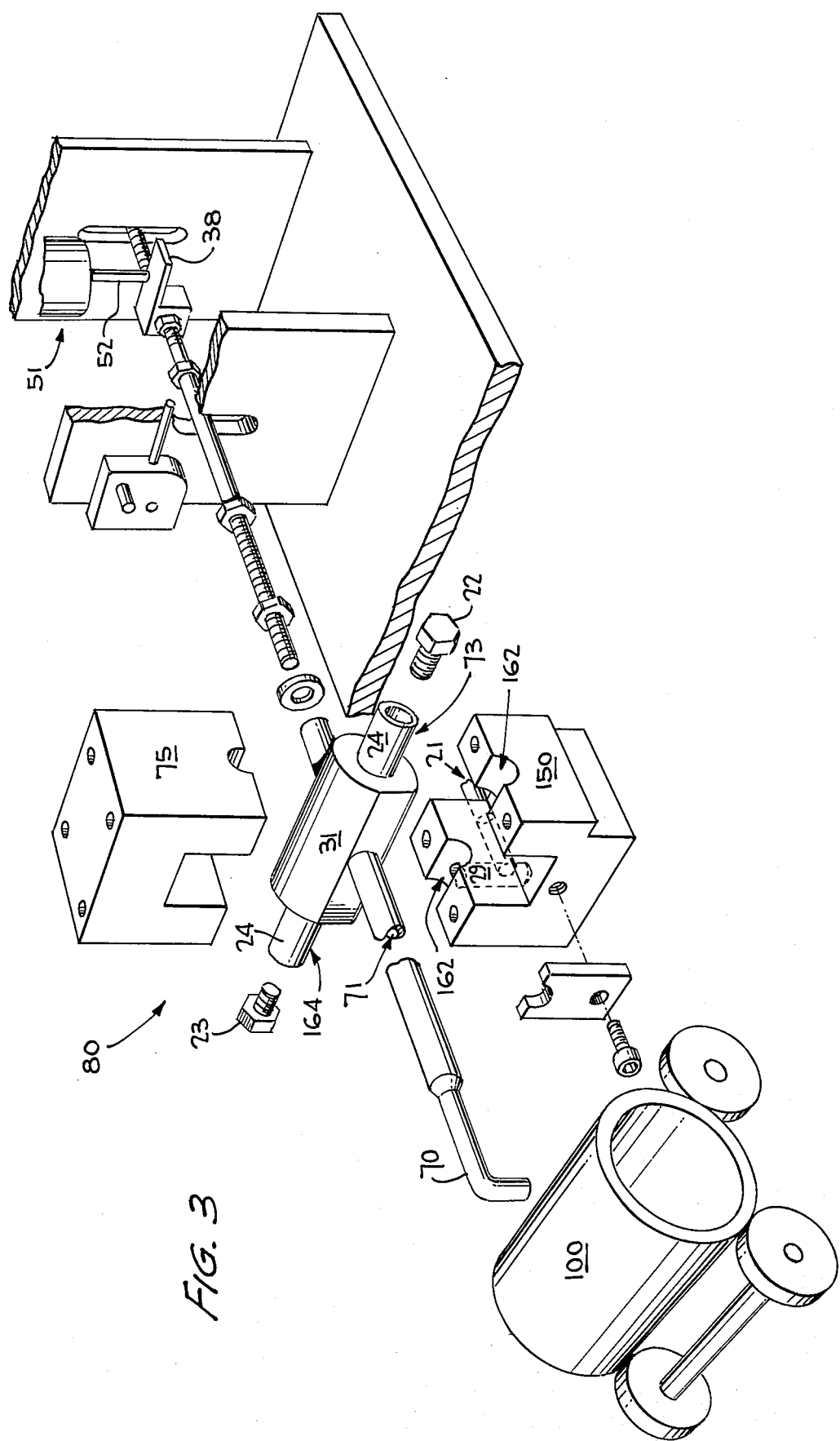
FIG. 3 is a disjointed perspective and elevated view of the specific embodiment of the invention showing the various parts.

FIG. 3 is an elevated perspective view of the embodiment of the invention as depicted in FIGS. 1 and 2. In particular, the fulcrum assembly 80 is comprised to two blocks 75 and 150. These blocks provide spaced support for pivot member 31 by means of an air support layer 162 for pivot member 24. In summary, air is permitted through connector 21 and passes through passageway 29 into the pivot block 31. An oblong opening 164 in pivot member 24 permits the stream to enter the block from passageway 29. The stream distributes itself such that a portion is permitted to exit through the oblong opening 73. Fluid is prevented from exiting concentrically from the pivot member 24 by means of the plugs. The remaining portion of the stream passes through the orifice 71 to the nozzle 70 to provide an air stream for impinging upon the cylindrical member 100. The nozzle 52 of the position sensor 51 emits a constant stream of air which maintains the nozzle at a constant distance above the platform member 38.

The position sensor 51 provides an input signal to the output means 5. This signal is directly related to the position of the nozzle 52 internally within the position sensor 51. Hence, the nozzle 52 always rides a specific distance above the platform member 38 and as the platform member 38 changes position so also does the nozzle 52 change position in corresponding degree. The entire nozzle 70, lever 25, pivot member 31, platform member 38, as assembled is completely suspended in air during the operating of the invention and is in spaced relationship to all other parts of the invention.

In order for the device to operate properly there must be a certain amount of imbalance between the portion of the lever 25 having the nozzle 70 and the position sensing portion of the lever. Force from the nozzle 70 supports this imbalance. The height of the supporting jet of air 81, that is, the distance from the nozzle to the piece being measured, is controlled by the nozzle supply pressure and the size of the nozzle.

The air support for the pivot shaft of the lever is important because tubing connected directly to any part of the lever would cause an erratic imbalance in the system since the tubing would have to follow the lever movement. The particular fulcrum arrangement allows practically unrestricted flow from the supply input to the standoff nozzle.

In some applications it is useful to utilize two or more devices at one time. Two devices of the embodiment of the present invention may be used to measure the internal and external diameters of the revolving cylinder previously discussed. Another possibility is to use three devices wherein one device measures the outside diameter and the second and third devices measure the inside, the second device being counterbalanced against the third device.

The inventor wishes it to be understood that any back pressure device such as is commonly in use in the art today may be substituted for the previously described position sensor unit.

The illustrated nozzles may be any suitable fluid signal forming means which produce a fluid condition between the means and the surface which is related to the spacing therebetween. Thus, the invention provides an essentially noncontacting position or length measurement or contour sensing device which can be employed to establish various control and recording functions in an open loop system.

Referring to FIG. 1, vertical block 61 has an oblong slot formed therein for receiving section 59 of the lever 25. Block 61 serves as a means for guiding the vertical motion of the rearward portion of the lever 25. A mechanical limit stop 60 is appropriately connected to the block 61 and serves to contact section 59 when this section of lever 25 experiences a maximum upward vertical excursion.

It is to be understood that the inventor does not desire to be limited to the exact details of construction shown and described for obvious modifications will occur to a person skilled in the art.

Various modes of carrying out the invention are contemplated as being within the scope of the following claims which particularly point out and distinctly claim the subject matter which is recorded as the invention.

What is claimed is:

1. A noncontacting contour and linear measurement apparatus for gauging a surface comprising a first fluid source means mounted in spaced relation to the surface and establishing a constant jet of fluid engaging said surface, lever means to rotate said first source means relative to the surface to continuously track the configuration of said surface, a positional sensing means to determine the position of an exteriority of the lever means, located adjacent to the lever means, and a fulcrum means mounted in spaced relation to the exteriority of said lever means and establishing a constant jet of fluid for supporting said exteriority.

2. The apparatus of claim 1 wherein said lever means comprises a pivot, said pivot being supported on a fluid in spaced relation to said fulcrum means.

3. The apparatus of claim 1 further comprising mitigating means attached to said lever dampening oscillation of said lever means, said mitigating means comprising a member mounted transverse to said lever means and in the plane of rotation, a spring formed around said member and attached thereto, and a weight attached to said spring.

4. The apparatus of claim 1 wherein said lever means is a partially tubular elongated lever having said first source means mounted in one end and wherein said fulcrum means comprises an input means for said first source means and a gas bearing for said lever.

5. The apparatus of claim 4 wherein said pivot is a hollow tube having a downward facing output opening on each side for emitting gas for support of said lever.

* * * * *